United States Patent [19]

Hudson

[11] Patent Number: 5,137,453
[45] Date of Patent: Aug. 11, 1992

[54] NOTE PAD PRODUCT FOR USE IN SHOWER OR BATH

[76] Inventor: Robert L. Hudson, P.O. Box 2490, Malibu, Calif. 90265

[21] Appl. No.: 553,524

[22] Filed: Jul. 17, 1990

[51] Int. Cl.⁵ ............................................. G09B 11/00
[52] U.S. Cl. ................................. 434/408; 434/415; 24/306; 40/597
[58] Field of Search ............... 434/408, 415, 421, 429, 434/365; 24/306; 40/597; 281/30, 31, 39

[56] References Cited

U.S. PATENT DOCUMENTS

| | | | |
|---|---|---|---|
| 332,050 | 12/1885 | Carter | 434/415 |
| 586,913 | 7/1897 | Patton | 434/415 |
| 4,047,259 | 9/1977 | Lotis | 24/306 X |
| 4,996,110 | 2/1991 | Tanuma et al. | 434/408 X |

FOREIGN PATENT DOCUMENTS 186146  9/1922  United Kingdom .................. 281/39

Primary Examiner—Richard J. Apley
Assistant Examiner—Rachel M. Healey

[57] ABSTRACT

A product comprising a waterproof note pad having a surface which may be written upon when wet and which may be erased by the use of a wet, soapy sponge or cloth. A pocket removably attached to the front surface of the pad for holding an appropriate grease pencil or other instrument, and suction cup fasteners mounted on the rear surface of the note pad to hold the product in the shower or on the bathroom wall adjacent to the bathtub. The pocket may be in the form of a sponge and which may be removably attached to the front surface so that the sponge may be used for erasing the writings from the note pad.

4 Claims, 1 Drawing Sheet

NOTE PAD PRODUCT FOR USE IN SHOWER OR BATH

BACKGROUND OF THE INVENTION

It is often desirable to provide a note pad in a shower or adjacent to a bathtub so that a person may jot down notes or other information which may occur to him or her while taking a shower or bath, and which he or she wishes to remember.

In addition, a person often feels creative in a shower or bathtub, and it is desirable to provide some means by which his or her creative thoughts or artistic expressions may be recorded at that time.

SUMMARY OF THE INVENTION

The invention provides a product which includes a note pad having a surface which may be written upon when wet, and which may be erased by the use of a wet, soapy sponge or cloth. A sponge in the form of a pocket is removably attached to the front surface of the note pad, for example, by a Velcro strip, and a grease pencil is held in the pocket. Suction cup or Velcro fasteners are mounted on the rear surface of the note pad to hold the product on the wall of the shower or adjacent to the bathtub.

DETAILED DESCRIPTION OF THE ILLUSTRATED EMBODIMENT

Figure 2:
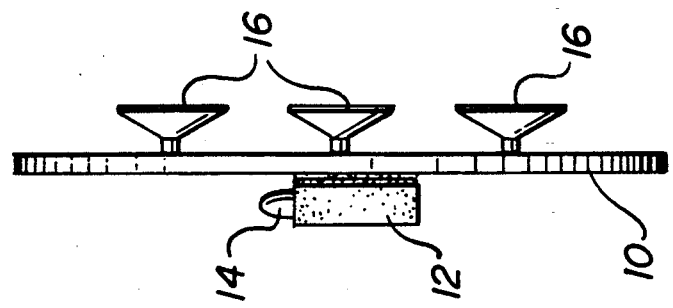
FIG. 2 is a side view.
Figure 1:
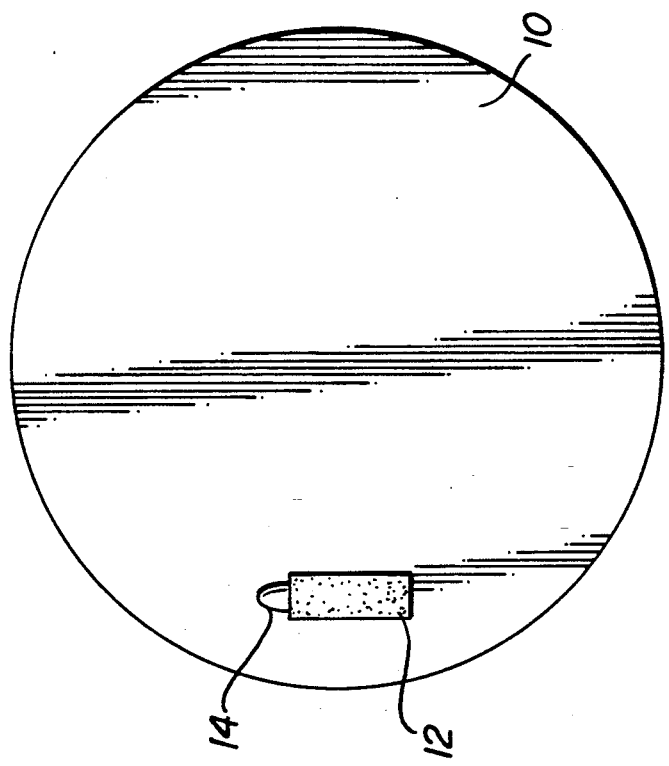
FIG. 1 is a front view of the product in one of its embodiments.

The product shown in FIGS. 1 and 2 includes a note pad 10 which may take the form of a solid member formed, for example, of acrylic polycarbonate, or high impact sryrene plastic alternately, note pad 10 may be paper with any appropriate design if desired, laminated into a waterproof plastic coating. Note, pad 10 may be round, rectangular or any other appropriate shape. The front surface of the note pad 10 is capable of receiving writing when wet, and by means of an appropriate writing instrument, such as a grease pencil. A felt tip marker also may be used with specially formulated ink, as described in U.S. Pat. No. 4,722,145. Such ink to be used with such a marking device, in addition to being water soluble to allow removal, must also contain a carrier or wetting agent to permit the ink dye to adhere to the plastic surface. Water base ink without a carrier will simply bead up and not adhere to the surface. Accordingly, a special ink has been developed which is formulated from commercially available water based ink dye and 0.5 percent by volume of methyl alcohol. Less alcohol significantly increases drying time to the point, at about 0.2 percent, wherein the ink will no longer adhere to the surface. Above 0.5 percent by volume, the alcohol begins to dilute the ink so that opacity becomes less. The alcohol performs a dual function of preventing the water from beading on the plastic surface and also accelerates the evaporation of the liquid portion of the ink. Since the ink dy adheres to the plastic surface, it is not removable by wiping with a dry wiper thus providing a semi-permanent record. However, since it is water soluble, the ink dye may be easily removed by wiping with a damp wiper thus allowing the sign to be re-used. Methanol alcohol and ethyl alcohol may also be used as suitable wetting agents. The writing may be easily erased from the surface of note pad 10, merely with a wet soapy sponge or cloth.

A pocket 12 is detachably attached to the front surface of note pad 10, for example, by means of a Velcro strip. Pocket 12 may be formed an appropriate sponge, and it is used to hold a grease pencil 14.

A number of suction cups 16 are (or Velcro fasteners) mounted on the rear surface of note pad 10, and they serve to hold the product in the shower or on the wall adjacent to a bathtub.

When a person wishes to write on the front surface of note pad 10, he or she merely removes the grease pencil 14 from pocket 12 and writes on the surface. Then, when the person wishes to erase the writing from the surface, he merely removes the pocket 12 from the surface and by use of soap and water, uses the sponge 12 to erase the writing from the surface.

The note pad may be easily taken out of the shower for future reference, merely by pulling it off the wall against the suction of suction cups 16.

The invention provides, therefore, a simple and effective product by which information may be inscribed while a person is taking a shower or bath.

It will be appreciated that while a particular embodiment has been shown and described, modifications may be made. It is intended in the claims to cover all modifications which come within the true spirit and scope of the invention.

I claim:

1. A product for use by a person in a shower or bathtub comprising:
    a member having a front surface capable of being written upon when wet;
    a pocket detachably mounted on the front face of said member, said pocket is formed of a sponge capable of erasing writing from the front face of said member;
    a writing instrument secured in said pocket; and
    attaching means mounted on the rear surface of said member capable of holding said member on the wall of a shower or bathtub.

2. The product defined in claim 1, wherein said writing instrument is in the form of a grease pencil.

3. The product defined in claim 1, in which said attaching means comprises a plurality of suction cups.

4. The product defined in claim 1, in which said member is formed of acrylic polycarbonate.

* * * * *